(12) United States Patent
Pirtle

(10) Patent No.: US 9,303,794 B2
(45) Date of Patent: Apr. 5, 2016

(54) BURIED PIPELINE REPAIR SYSTEM

(71) Applicant: James Pirtle, New Orleans, LA (US)

(72) Inventor: James Pirtle, New Orleans, LA (US)

(*) Notice: Subject to any disclaimer, the term of this patent is extended or adjusted under 35 U.S.C. 154(b) by 94 days.

(21) Appl. No.: 14/076,695

(22) Filed: Nov. 11, 2013

(65) Prior Publication Data
US 2015/0132064 A1   May 14, 2015

(51) Int. Cl.
*F16L 3/26* (2006.01)
*F16L 1/26* (2006.01)
*F16L 1/20* (2006.01)
*B66F 3/35* (2006.01)
*F16L 1/028* (2006.01)
*F16L 1/06* (2006.01)

(52) U.S. Cl.
CPC ... *F16L 3/26* (2013.01); *B66F 3/35* (2013.01); *F16L 1/028* (2013.01); *F16L 1/06* (2013.01); *F16L 1/20* (2013.01); *F16L 1/26* (2013.01)

(58) Field of Classification Search
CPC ............. F16L 1/20; F16L 55/18; F16L 1/028; F16L 1/06; F16L 3/26; F16L 1/00; F16L 3/00; B63C 7/10; B63C 7/12; E02D 29/0291; E02D 29/06
See application file for complete search history.

(56) References Cited

U.S. PATENT DOCUMENTS

| 1,293,899 | A | * | 2/1919 | Pendergast ...................... 114/54 |
| 5,044,827 | A | * | 9/1991 | Gray et al. ..................... 405/173 |
| 5,425,599 | A | * | 6/1995 | Hall et al. ..................... 405/158 |
| 5,518,340 | A | * | 5/1996 | Hall et al. ..................... 405/158 |
| 5,579,698 | A | * | 12/1996 | Lis et al. ....................... 105/364 |
| 6,220,788 | B1 | | 4/2001 | Jewell |
| 6,863,248 | B2 | | 3/2005 | Calais et al. |
| 8,413,960 | B2 | * | 4/2013 | Davis ......................... 254/93 HP |
| 2006/0027276 | A1 | * | 2/2006 | Main .............................. 138/93 |

FOREIGN PATENT DOCUMENTS

| CN | 2693744 | * | 4/2005 |
| FR | 2476263 A1 | | 8/1981 |
| GB | 1585170 A | | 2/1981 |
| RU | 90522 U1 | | 1/2010 |

* cited by examiner

*Primary Examiner* — Benjamin Fiorello
*Assistant Examiner* — Carib Oquendo
(74) *Attorney, Agent, or Firm* — Keaty Law Firm LLC

(57) ABSTRACT

A damaged portion of a pipeline buried in a trench is gradually lifted from the trench to expose the damaged portion above water and provide easy access to the damaged portion. Inflatable roller bags are placed under the pipeline adjacent the damaged portion; the roller bags are then inflated in a controlled manner using a computer-based control unit. A control manifold is connected to the control unit and each of the roller bags by a separate air conduit allowing controlled bag-inflation and bag-deflation process for each roller bag. Once the pipeline is repaired, the roller bags are deflated, lowering the pipeline back to its original position in the trench.

23 Claims, 10 Drawing Sheets

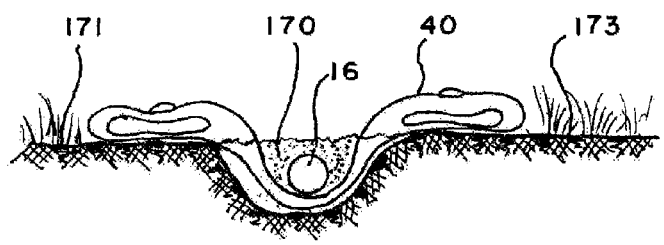
F I G. 4
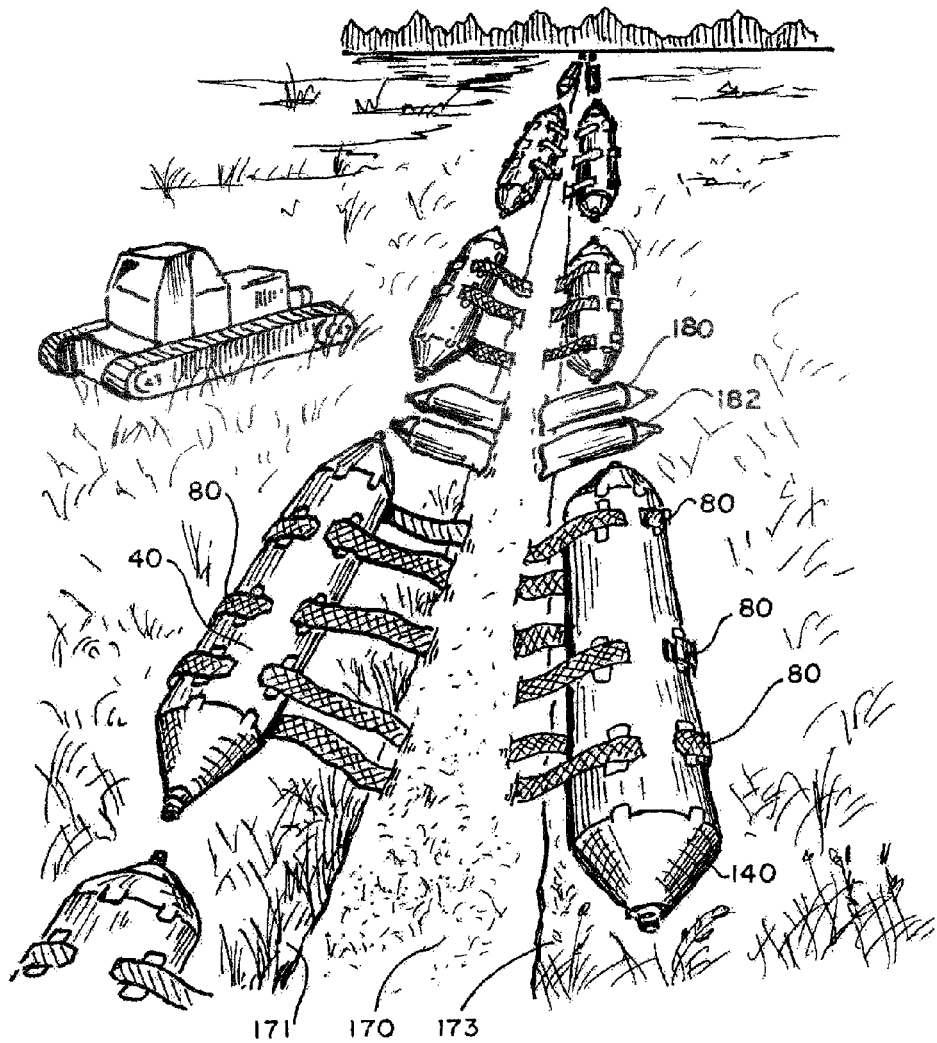
F I G. 5

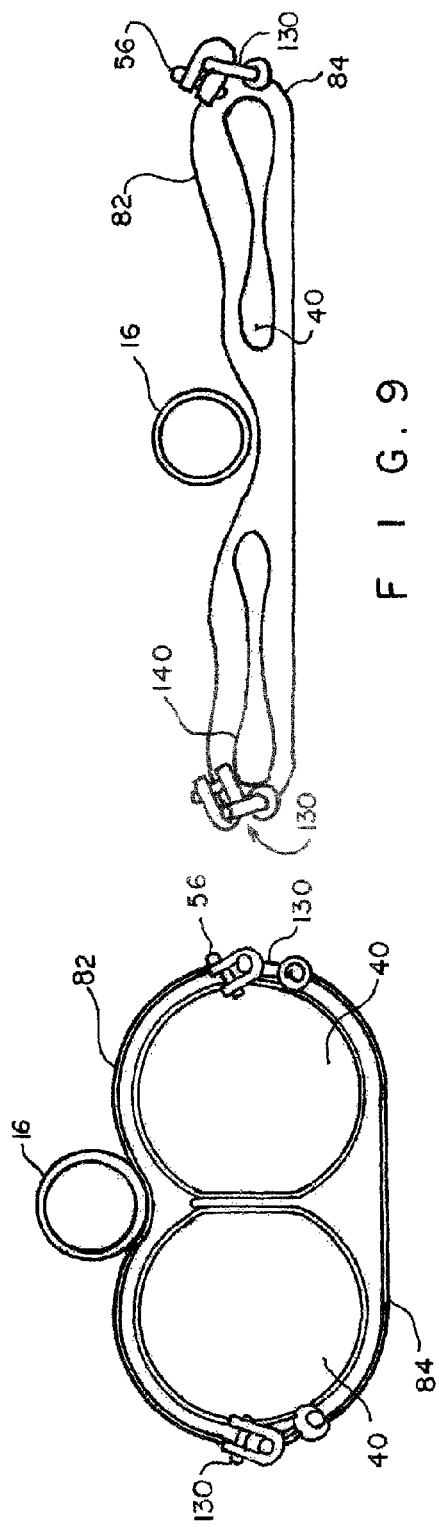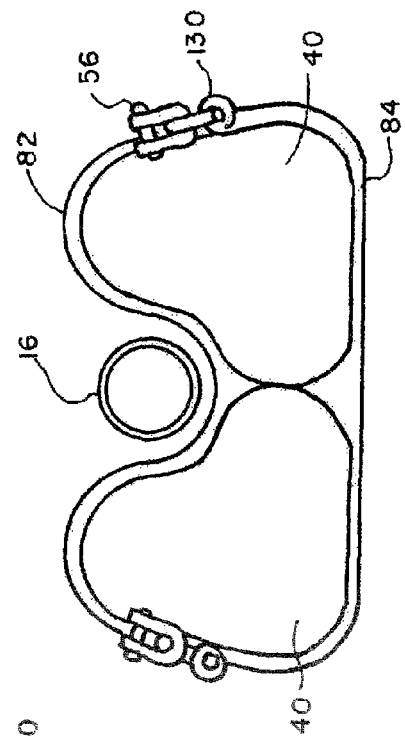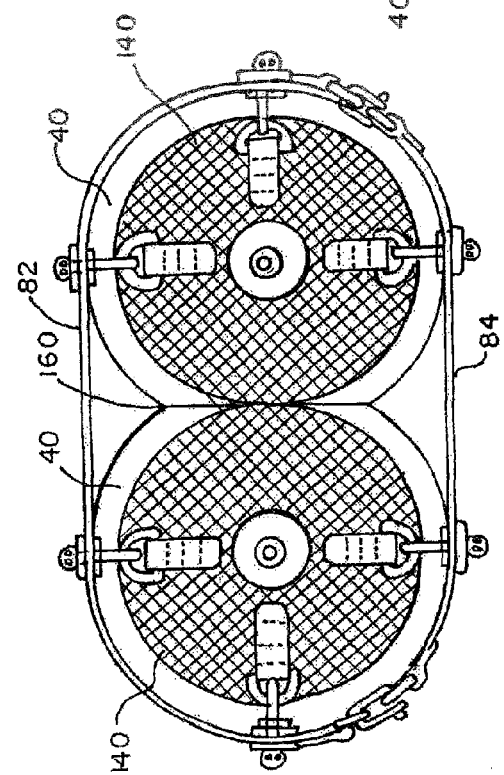

BURIED PIPELINE REPAIR SYSTEM

BACKGROUND OF THE INVENTION

This invention relates to a system for repairing leaking pipelines and, more particularly, to an apparatus and method of repairing buried leaking pipelines.

Oil and gas pipes are prone to leakage caused by damage or deterioration over time. Public safety requires that a leaking pipeline be expeditiously repaired. In the case of oil and gas carrying pipelines, the repairs should be performed with all possible haste to minimize damage to property and environment.

When the leak in the pipe is readily accessible, repairing the leak is fairly straightforward. However, when the leaking pipe is buried in a trench filled with water or is otherwise not readily accessible, it is frequently difficult not only to locate the leak, but to repair the pipe and seal off the leak. According to the federal regulations, an oil or gas pipe must be buried in a trench nine feet below the surface. With time, water, silt and soil fill the trench and cover the pipeline, as a result of which it becomes more difficult to access the pipeline. When the damaged portion of the pipeline is under water the repair process becomes considerably more complicated and expensive. It is much more preferable to expose the damaged portion by lifting it from the trench. The lifting of the pipe must be performed in a manner that will not cause further damage to the pipe.

The present invention addresses the difficulties encountered in the prior art by providing a system for raising a portion of the buried pipeline where the leak is suspected in a manner that does not result in an imposition of undue stresses on the pipeline that could break the pipeline and allow escape of hazardous substances from the pipe. The damaged portion of the pipeline is gradually lifted to become exposed above water and to allow repair of the pipeline using conventional methods.

SUMMARY OF THE INVENTION

It is, therefore, an object of the present invention to provide a system of repairing buried pipelines, which involves exposing of a portion of the pipeline above the surface.

It is another object of the invention to provide a system of repairing a buried pipeline, which allows to gradual lifting of a damaged portion of the pipeline from a trench. These and other objects of the invention are achieved through a provision of a system for repairing a damaged portion of a pipeline buried in a trench. The system has a plurality of inflatable roller bags positionable, while deflated, under the pipeline adjacent the damaged portion. Flexible sling members engage some of the roller bags in pairs to form longitudinal units that are positioned longitudinally in the trench along the pipeline. A pair of spaced apart transverse inflatable roller bags is positioned in the trench under the pipeline transversely to the pipeline to isolate the damaged pipeline portion as the damaged portion is lifted.

The system includes a source of pressurized air for inflating the roller bags and a means for regulating delivery and release of pressurized air into the roller bags. As the roller bags are inflated using computer-based regulating system and video feed from strategically positioned video cameras, the pipeline portion adjacent the damaged part is gradually lifted from the trench and exposed above the water surface to allow repair of the damage by conventional techniques.

BRIEF DESCRIPTION OF THE DRAWINGS

Reference will now be made to the drawings, wherein like parts are designated by like numerals, and wherein

FIG. 4 is an end view showing position of inflatable roller bags adjacent a pipeline.

FIG. 5 illustrates position of inflated roller bags positioned adjacent a pipeline with slings extending under water.

FIG. 9 is a schematic view illustrating an initial step of positioning a pipe sling under a buried pipe.

FIG. 10 schematically illustrates partially inflated roller bags lifting a pipe.

FIG. 11 schematically illustrates fully inflated roller bags lifting a pipe.

FIG. 13 is a detail view of a connector member connected to an air hose.

FIG. 14 is a detail view of a swivel connector member mounted between an inflatable air roller and a roller air hose.

DETAIL DESCRIPTION OF THE INVENTION

Figure 1:
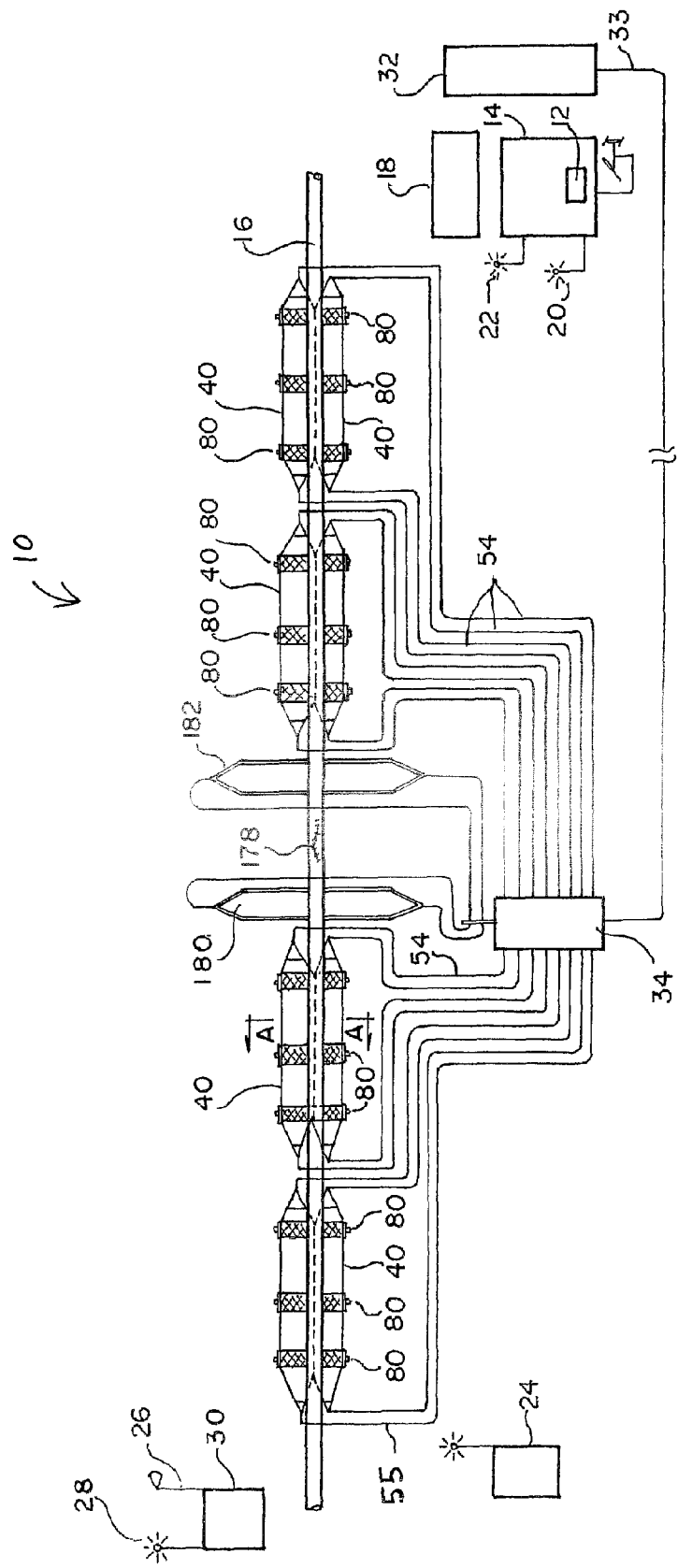
FIG. 1 is a schematic view illustrating the pipeline repair system of the present invention.
Figure 2:
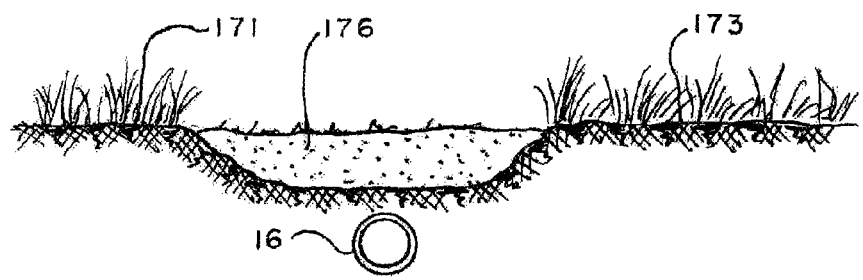
FIG. 2 is a schematic view illustrating position of a pipeline in a trench.
Figure 3:
FIG. 3 illustrates a step of detecting location of a damaged segment of a pipeline.

Turning now to the drawings in more detail, numeral 10 designates the computer-based system for repairing buried pipelines according to this invention. The system 10 is designed to lift a portion of a buried pipeline, which has a detected leak, such that a damaged section becomes exposed for repairs above the water surface.

The pipeline repair system 10 comprises a computer-based control unit 12 which can be housed in a control unit housing 14. The control unit housing 14 is positioned adjacent a pipeline 16. A power source 18 supplies power to the control unit 12. The system 10 is provided with wireless communication means for operating delivery of compressed air and release of air, when required, from the roller bags, as will be described in more detail hereinafter. A control manifold antenna 20 is placed on exterior of the control unit housing 14 to send the control signals to the compressors and receive feedback from video input devices. A video antenna 22 is positioned on the exterior of the control unit housing 14 to process live feed signal from a central video camera data center 24 positioned a distance from the control unit housing 14.

The central video data center 24 collects video signals from a plurality of video cameras placed strategically along the pipeline 16. One such video camera is schematically illustrated in FIG. 1 and is designated by numeral 26. The video input devices, such as the video cameras 26 are combined with wireless transducer antennas 28 in video camera units 30, which transmit the collected data to the control unit 12 in a wireless operation.

The system of the present invention comprises one or more air compressors 32, which are designed to supply compressed air to a plurality of inflatable roller bags 40. The air compressor 32 can be a 185CFM air compressor or other suitable compressor. The air compressor 32 can be diesel-powered and delivered to the site on a truck bed or other suitable modes of delivery. The air compressor 32 supplies compressed air via a respective compressor air hose 33 to an associated control manifold unit 34. The air hose 33 can be formed as a flexible conduit having 2" diameter.

The control manifold unit 34 comprises a plurality of regulating valves 36 operationally connected to a pair of air manifolds 37, 38 mounted in the manifold control unit 34. The regulating valves 36 communicate with the air manifolds 37, 38 via a plurality of air conduits 46. Each air conduit 46 is independently connected to an air supply hose used for inflating the flexible roller bags 40. Nipple valves 47 are positioned between the air conduits 46 and the air manifolds 37, 38.

The control manifold unit 34 also supports a plurality of air pressure release valves 48, which are separately connected to individual roller bags 40 and are designed to release air from the inflatable roller bags 40 depending on the internal pressure in each the inflatable rollers in order to maintain stability of the pipeline 16. A battery bank 49 may be provided in the control manifold unit 34 to ensure that a back-up power source is available during the pipe lifting and lowering operation.

The air manifolds 37, 38 are each independently connected to a gas tank 50 mounted in the control manifold unit 34. The gas tank 50 contains a pre-determined quantity of compressed air, for instance a volume of 80 gallons. Suitable air supply conduits 52 connect the gas tank 50 to the air conduits 46. A nipple valve 54 can be mounted between the gas tank 50 and the air supply conduit 52. The control unit 12 sends wireless signals to the control manifold unit 34 for regulating inflation and deflation of the roller bags 40.

Each of the air regulating valves 36 is operationally connected to a respective inflatable roller back 40 by an independent flexible roller air conduit or roller air hose 55. The roller air hose can be a conduit having a 1" diameter. A swivel connector member 56 is mounted between the roller air hose 55 and an inlet end 58 of the inflatable roller bag 40. The swivel connector member 56 comprises a first fixed end 60 designed for engaging the roller air hose 54 and a second fixed end 62 designed for engaging the inflatable roller bag 40. The swivel connector member 56 is substantially hollow allowing air to move therethrough. A shut off valve 64 is mounted on the swivel connector member 56 for closing the air flow to and from the inflatable roller 40. A pressure gauge 68 is incorporated in the swivel connector member 56 to allow visual evaluation of the pressure in the air flow being delivered or escaping the inflatable roller 40.

The swivel connector member 56 has a pair of elbow connector parts 70, 72 positioned adjacent the second end 62 of the swivel connector member 56. The first elbow connector part 70 is capable of rotating about an axis 71 at the joint 74 and about an axis 73 at the joint 76. The joint 74 allows rotation of the first elbow connector part 70 in relation to the fixed second end 62, while the joint 76 allows rotation of the first elbow connector part 70 in relation to the fixed second elbow connector part 72. This double-swivel feature allows the roller air hose 54 to assume any desired position in relation to the inflatable roller bags 40 when the roller bags 40 are placed in a trench, while resisting twisting or kinking of the roller air hose 55.

Each of the inflatable roller bags 40 has a generally cylindrical configuration with narrowed conical ends (FIG. 13) suitable for connecting the roller air hoses 54 via the connector swivel connector member 56 detachably engageable therewith. In one aspect of the invention, the body of the inflatable roller bag 40 is formed from a flexible, scuff and puncture-resistant material. Since the inflatable roller bags 40 are designed to be positioned in often rough terrain, the scuff and puncture-resistant qualities ensure that an inflated roller does not lose its cylindrical configuration even when a heavy pipeline rests thereon. The roller bags 40 easily adapt to the terrain by slightly deforming, if necessary, while still maintaining their substantially cylindrical configuration. In one of the preferred embodiments, each roller bag 40 is about 6 feet in diameter and 30 feet long, forming a bag capable of retaining about 7 PSI air pressure.

A system of slights and straps forms a means operationally connected to the roller bags for supporting the roller bags under the pipeline while the damaged portion of the pipeline is raised from its buried position in the trench. FIGS. 15-24 illustrate the sling members 80, which form a part of the pipeline repair system 10. The sling members 80 are configured for detachable mounting over some of the roller bags 40. In one embodiment of this invention, three sling members 80 are mounted across each roller bag 40, which is configured for longitudinal positioning along the trench.

Each sling member 80 comprises an upper sling portion 82 and a lower sling portion 84 detachably engageable with the upper sling portion 82. The upper sling portion 82 comprises an elongated part 86 having a generally rectangular planar main body 88 and a pair of narrowed opposing ends 90, 92. A plurality of transverse straps 93, 94, 95, 96 is secured to the main body 88 in a transverse relationship to a longitudinal axis of the main body 88. The transverse strap 93 is affixed to the main body 88 adjacent the first end 90, the transverse strap 96 is secured adjacent the second end 92, while the transverse straps 94 and 95 are secured in a spaced apart relationship to each other and to the transverse straps 93 and 96.

A securing member, such as a D-ring 98, is attached at each end of the transverse straps 93, 94, 95, and 96. The D-rings 98 of adjacent transverse straps are secure by one or more shackle links 99 when the sling member is mounted on the roller bags.

The ends 90 and 92 carry a flexible longitudinal strap 100 and 102, respectively. The longitudinal straps 100 and 102 extend from a narrow ends 90, 92 to some distance along the main body 88 along an imaginary centerline of the ends 100, 102 and of the main body 88. The longitudinal straps 100, 102 intersect the transverse traps 93, 96, respectively at a right angle further reinforcing the upper sling member 82.

An apex securing member, such as a D-ring 104, 106 is attached to a free end of each of the longitudinal strap 100, 102, respectively. A shackle link connects the apex D-rings 104, 106 with end slings, as will be explained below. In one aspect of the invention, the upper sling member 82 and the straps 93, 94, 95, 96, 100, and 102 are formed from a strong woven material, such as for instance polyester webbing. The D-rings and shackles can be made of non-corrosive metal and metal alloys.

The lower sling portion 84 has longitudinal dimensions smaller than the upper sling portion 82. Similarly to the upper sling portion 82, the lower sling portion 84 has a generally rectangular planar main body 110 with opposing narrowed ends 112, 114. A pair of transverse straps 116, 118 is secured to the main body 110 in a spaced apart relationship a distance from the respective narrow ends 112, 114. Each strap carries a securing member, such as a D-ring on each of its opposing ends.

A longitudinal strap 122 is secured to the first end 112 to extend from an apex of the first end 112 along the centerline and inwardly along the main body 110. A second longitudinal strap 124 is secured to the second end 114 to extend from an apex of the second end 114 along a centerline and inwardly along the main body 110. A securing member, such as a D-ring 126, 128 is secured to the free end of each of the longitudinal strap 122, 124, respectively. One or more shackle links 130 connect adjacent D-rings of the transverse straps 116, 118. Similarly to the upper sling portion 82, the main body and the straps of the lower sling portion can be formed from polyester webbing, while the D-rings and the shackles are made of metal or metal alloy.

Figure 22:
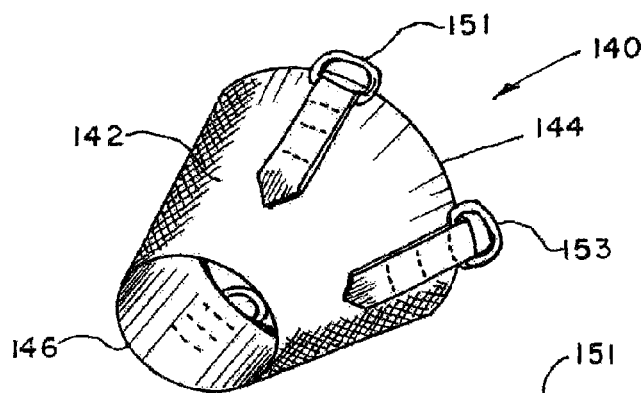
FIG. 22 is a perspective view of an end sling portion.
Figure 24:
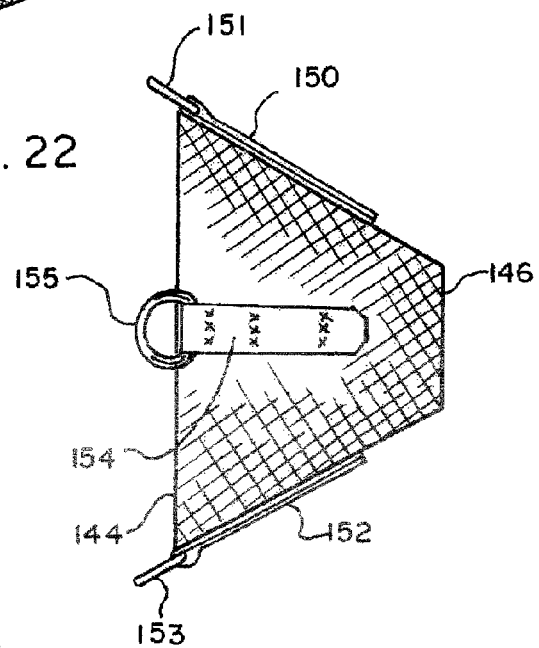
FIG. 24 is a side view of the end sling portion.
Figure 23:
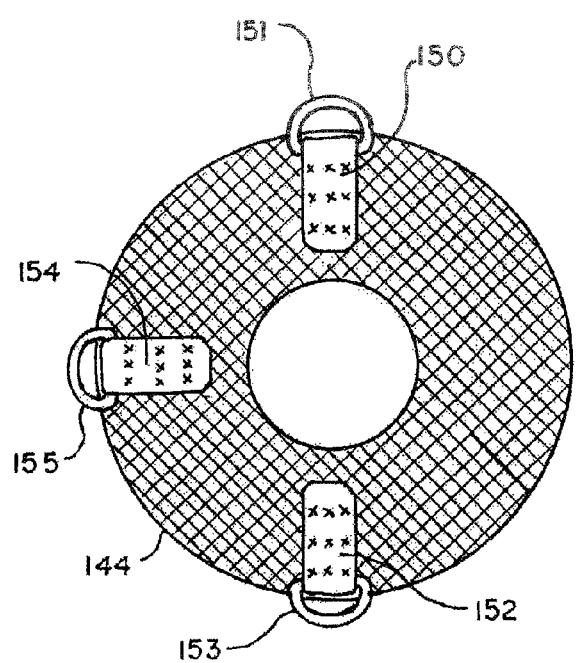
FIG. 23 is an end view of the end sling portion.

FIGS. 22-24 illustrate an end sling member 140, which is configured for detachable mounting on each of the conical ends of a roller bag 40. The end sling member 140 comprises a generally frustoconical flexible bendable hollow end sling body 142. The sling body 142 defines a base 144 and an apex 146. Each end sling member 140 carries three straps 150, 152, and 154 secured to an exterior surface thereof. The straps 150 and 152 are spaced at 180 degrees from each other about circumference of the end sling body 142. The middle strap 154 is affixed 90 degrees apart from both the strap 150 and 152. The straps 150, 152, and 154 extend from the base 144 along the end sling body 142.

A free end of each of the straps 150, 152, and 154 carries a securing D-ring 151, 153, and 155, respectively. Similarly to the upper sling portion 82 and the lower sling portion 84, the end sling body 142 and the straps of the lower sling portion can be formed from polyester webbing, while the D-rings are made of metal or metal alloy.

Figure 17:
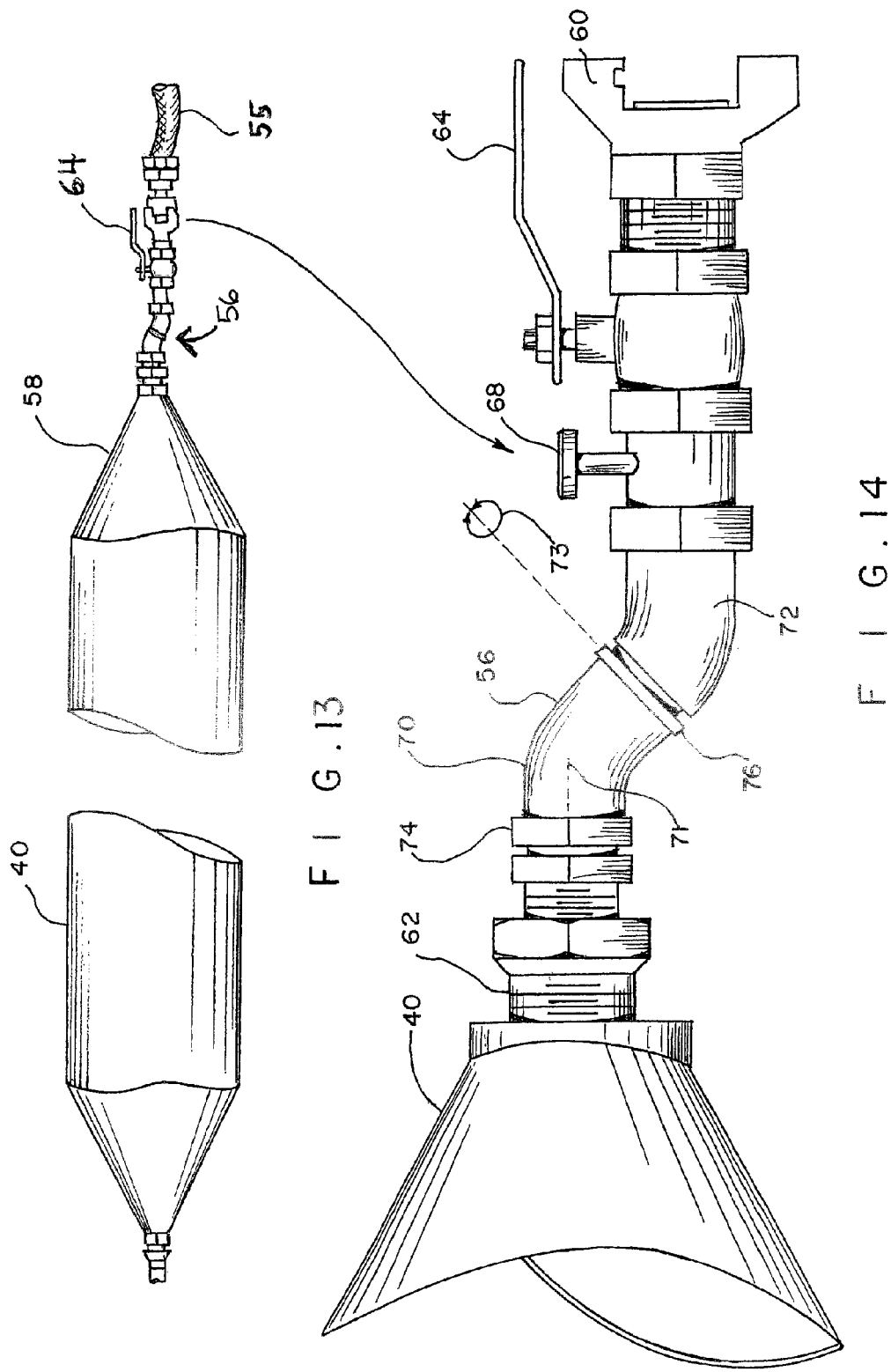
FIG. 17 is an end view of the sling member mounted on a pair of roller bags.
Figure 18:
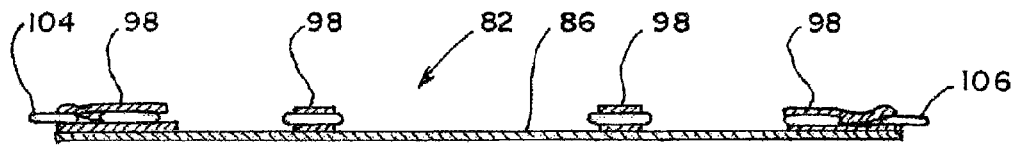
FIG. 18 is a side view of an upper sling portion.
Figure 19:
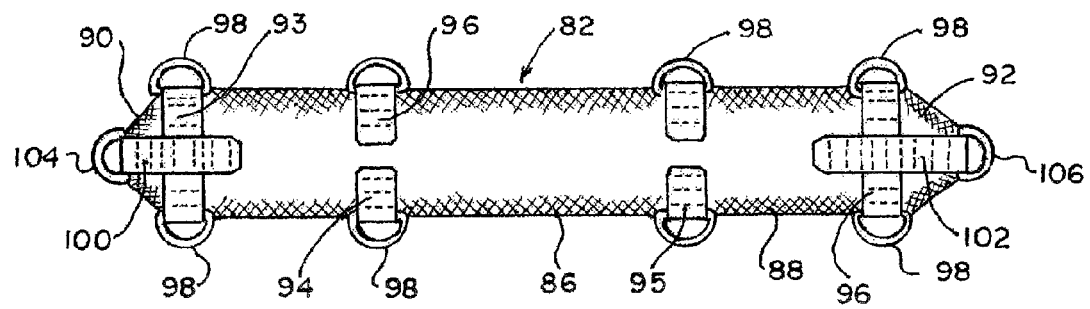
FIG. 19 is a plan view of the upper sling portion.
Figure 20:
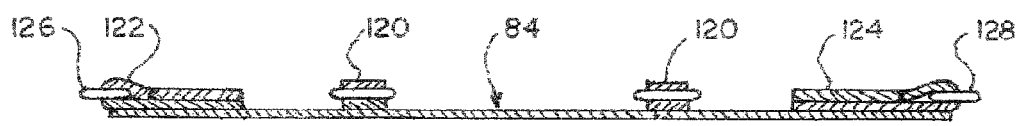
FIG. 20 is a side view of a lower sling portion.
Figure 21:
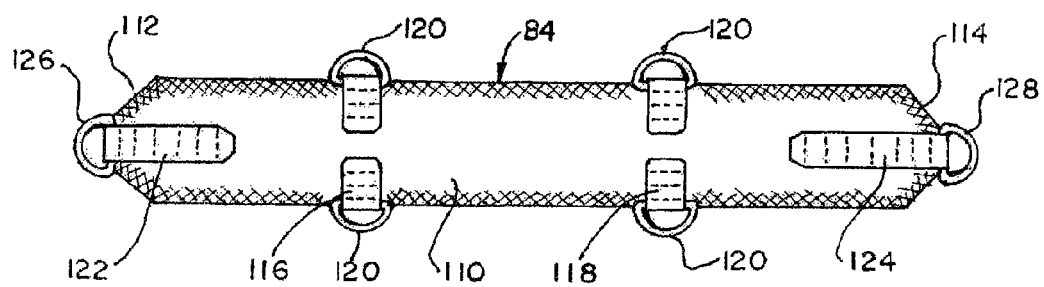
FIG. 21 is a plan view of the lower sling portion.

As can be seen in FIG. 17, the end sling member 140 is secured to both the upper sling member 82 and the lower sling member 84 using shackles, which extend between the D-rings 104, 106, 126, 128 and 151, 153, and 155 when the sling portions 82, 84, and 140 are mounted on the roller bags 40. The sling portions 82, 84, and 140 secure some of the roller bags 40 in pairs to act as a unit 200 when raising the pipeline from a trench. In this unit, two roller bags 40, when inflated, contact each other along a contact line 160 along a major part of the roller bodies. In practice, the axes of the roller bags 40 are substantially parallel when the units 200 are formed using the securing sling members 80.

Figure 6:
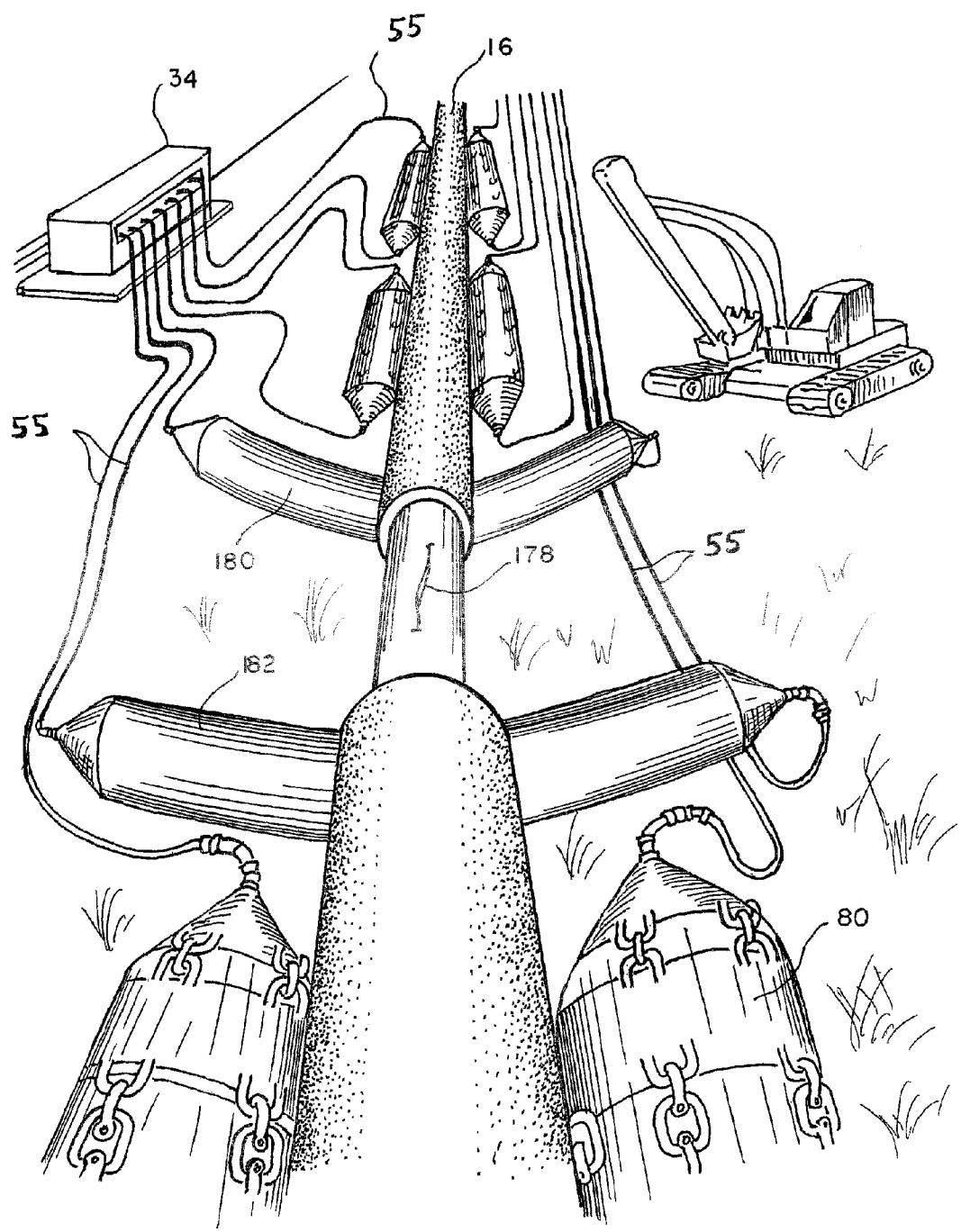
FIG. 6 is a detail view illustrating position of partially inflated roller bags adjacent the pipeline, with the roller bags connected to a control manifold unit.
Figure 8:
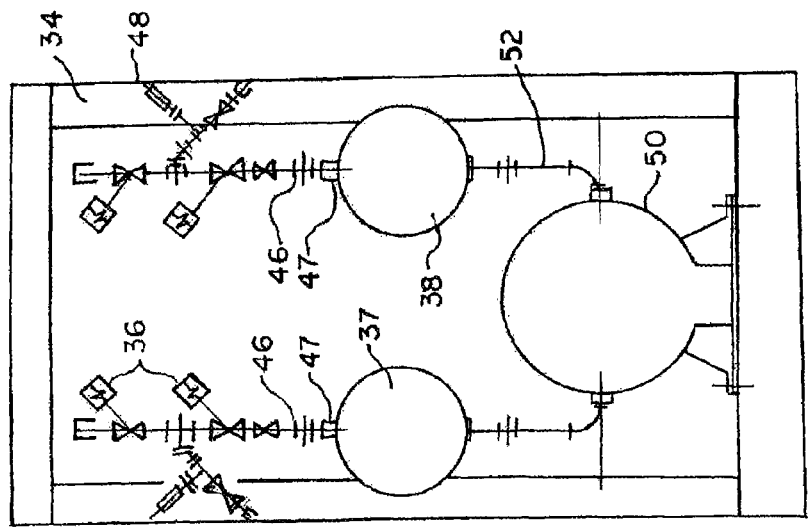
FIG. 8 is a schematic end view of the control manifold unit.
Figure 7:
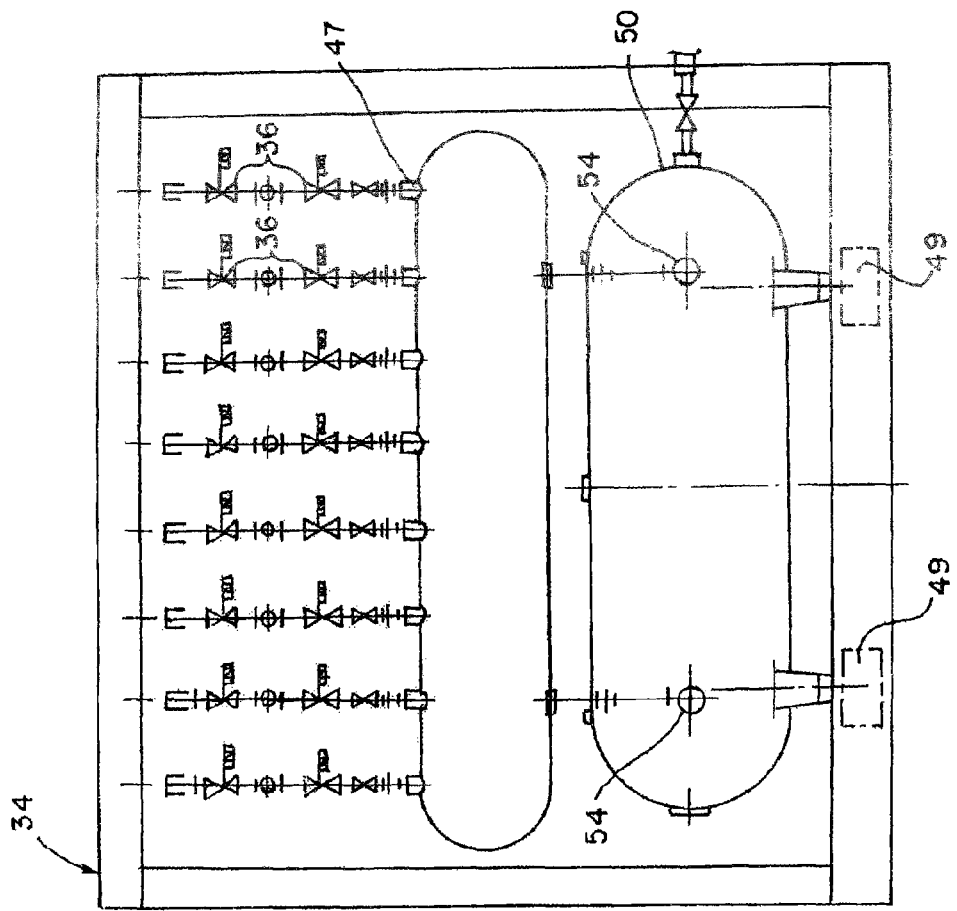
FIG. 7 is a schematic view illustrating general arrangement a control manifold unit.

A leak in the pipeline 16 is usually discovered by either detecting a pressure drop in the pipeline or by visually observing bubbling gas in a trench 170. A repair person 172 can test the depth of the buried pipeline using a measuring pole 174 or other conventional methods. In some cases it may become necessary to employ divers to determine position of the pipeline in the trench 170. Once the location of the damage in the pipeline 16 is identified, the bottom 176 of the trench 170 is excavated to allow positioning of the roller bags under the pipeline 16. In FIG. 6, the damaged area of the pipeline 16 is identified by reference numeral 178.

The crew members install three lower sling portions 84 per each roller bag 40 across the trench 170, under the pipeline 16 such that the lower sling portions lie on the trench bottom and extend upwardly to the trench banks. Divers can be employed to properly position the sling members under the pipeline 16. Two deflated roller bags 40 are placed side-by-side, adjacent the pipeline 16 and across the lower sling portions 84. The axes of the roller bags 40 are oriented substantially parallel to the longitudinal axis of the pipeline 16. Three upper sling portions 82 are also positioned under the pipeline 16, across the roller bags 40, and in alignment with the lower sling portions 84. The lower sling portions 84 are then secured to the upper sling portions 82 using the straps and shackles. The roller bags 40 become tied in pairs between the upper sling portions and the a lower sling portions.

The sling portions 82, 84 and the roller bags 40 are placed adjacent to the damaged apportion 170 of the pipeline 16. As can be seen in the drawings, several units of the paired roller bags are placed along the pipeline, with ends of the sling portions 82, 84 resting on opposite banks 171, 173 of the trench 170.

Transverse roller bags 180, 182 are then placed under the pipeline 16 immediately adjacent the damaged area 178, as shown in FIGS. 5 and 6. The transverse roller bags 180, 192 have the same physical characteristics as the roller bags 40. Each roller bag 40, 180 and 182 is then connected by separate hoses 54 to the central manifold 34 (FIG. 6). Pressurized gas is then admitted into the deflated roller bags 40 simultaneously. The pressure inflation rate is controlled using the control manifold unit 34 and the pressure regulating valves 36. If the stress on the pipeline 16 becomes excessive and there is a risk of stress-related damage, the pressure relief valves 48 can be used to release air from any one of the roller bags 40 through the independent hoses connecting the roller bag 40 the control manifold unit 34.

As the roller bags 40 are gradually inflated, they begin to lift the pipeline 16, with the upper sling portions 82 acting as a cradle or supporting surface. The partially inflated roller bags 40 are shown supporting the pipeline 16 in FIGS. 6 and 10. The process of inflating the roller bags and gradual elevation of the pipeline section is carefully monitored using the cameras placed adjacent the pipeline and live feed signals from the video cameras to the control unit 12.

To avoid sharp rise of the pipeline and excessive stress on the elongated pipeline, the roller bag units are positioned in multiple locations along the pipeline on both sides of the damaged area 178, as can be seen in the schematic illustration in FIG. 1. A first pre-determined quantity of the roller bags, for instance eight roller bags can be secured in pairs and placed with their longitudinal axes substantially parallel to the longitudinal axis of the pipeline adjacent the damaged portion 178, while a second pre-determined quantity, for instance two roller bags can be positioned immediately adjacent to, and on each side of the damaged area 178 with their axes extending transversely to the longitudinal axis of the pipeline. It is envisioned that the two transverse roller bags 180, 182 will be sufficient to isolate the damaged area.

Figure 12:
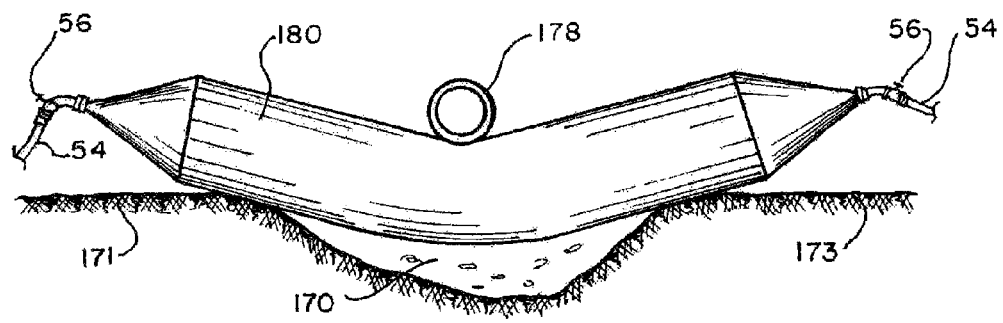
FIG. 12 schematically illustrates positioning of transverse roller bag.
Figure 15:
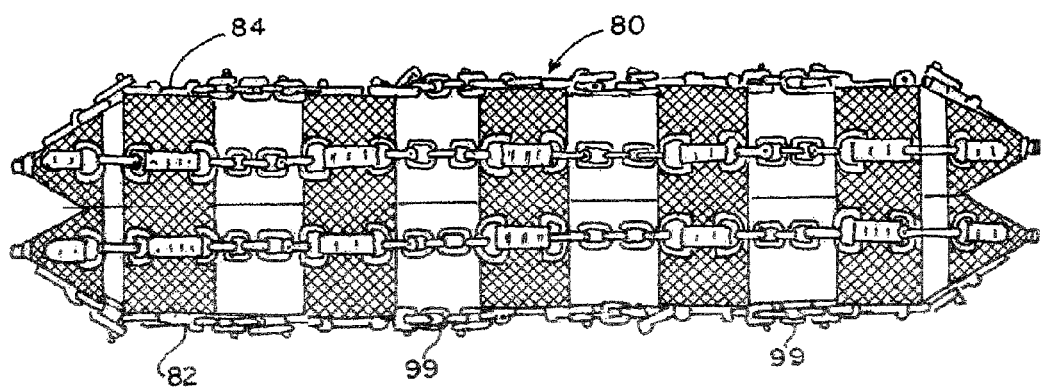
FIG. 15 is a plan view of a sling member.
Figure 16:
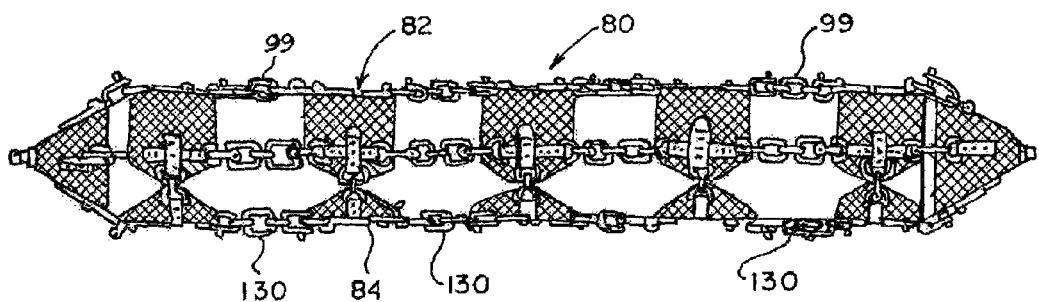
FIG. 16 is a plan view of the sling member seen at 90 degrees in relation to the view of FIG. 15.

When the roller bags 40 are fully inflated, as schematically shown in FIG. 11, the pipeline is elevated above the water surface in the trench 170. The damaged area 178 is fully exposed and ready for repair. FIG. 12 schematically illustrates position of transverse roller bags 180, 182 in the trench 170. Opposite ends of the immediately adjacent transverse roller bags 180, 182 rest on the opposite banks 171, 173 of the trench 170. The damaged area 178 of the pipeline 16 is cradled on the transverse roller bags 180, 182. When the damaged area is fully exposed the crew members can repair the leak in the pipeline 16 using conventional methods.

It is envisioned that the damaged portion of the pipeline can be replaced, repaired using weld overlay, or by placing an encircling sleeve over the damaged area. Some conventional techniques may also utilize a mechanical leak clamp, composite overwrap, a patch, and the like. The repair techniques depend on type of defects and the service of the line.

Once the pipeline 16 is repaired the roller bags 40 are gradually deflated, the sling member 80 are removed, and the pipeline 40 is returned to its original position in the trench 170. The roller bags, the sling members, the hoses and all control equipment are retrieved for use in other locations.

The present invention allows considerable saving of time and human resources in repairing a pipeline by lifting the pipeline from its buried location and supporting the damaged section of the pipeline as the repairs are taking place.

Many changes and modifications can be made in the system of the present invention without departing from the spirit thereof. I, therefore, pray that my rights to the present invention be limited only by the scope of the appended claims.

I claim:

1. A system for repairing a damaged portion of a pipeline buried in a trench, the system comprising:
    a plurality of inflatable roller bags positionable, while deflated, under the pipeline adjacent the damaged portion, each of said roller bags having a tubular configuration and a longitudinal axis, and wherein a first pre-determined quantity of the roller bags is configured for positioning under the pipeline adjacent the damaged portion of the pipeline along the pipeline, and wherein a second pre-determined quantity of the roller bags is configured for positioning under the pipeline immediately adjacent the damaged portion with their longitudinal axes being oriented transversely to a longitudinal axis of the pipeline;
    a means operationally connected to the roller bags for supporting the roller bags under the pipeline while the damaged portion of the pipeline is raised from its buried position in the trench, said supporting means comprising a sling member detachably engaging, in pairs, the first pre-determined quantity of the roller bags, wherein a plurality of spaced-apart sling members is mounted on each of the first pre-determined quantity of the roller bags;
    a source of pressurized air for inflating the inflatable roller bags, each of the sling members comprising a flexible bendable upper sling portion and a flexible bendable lower sling portion, the upper sling portion and the lower sling portion each comprising an elongated planar main body and a plurality of flexible transverse straps secured transversely to the main body in a spaced apart relationship to each other; and
    a computer-based control unit for regulating delivery and release of pressurized air into and from the inflatable roller bags.

2. The system of claim 1, the upper sling portion and the lower sling portion further comprising a flexible end strap secured to the main body and extending from each end of the main body.

3. The system of claim 2, wherein the end straps of the upper sling portion extend across at least some of the transverse straps.

4. The system of claim 2, wherein free ends of the transverse straps and the end straps carry a securing member.

5. The system of claim 4, said securing member comprising a D-ring.

6. The system of claim 4, comprising a plurality of shackle members connecting adjacent securing members.

7. The system of claim 1, further comprising an end sling member mounted on each end of the roller bag, said end sling member being detachably engageable with the upper sling portion and the lower sling portion.

8. The system of claim 7, said end sling member having a hollow frustoconical configuration.

9. A method of repairing a damaged portion of a pipeline buried in a trench having a bottom and opposing banks, the method comprising the steps:
    providing a plurality of inflatable roller bags;
    providing a source of pressurized air for inflating the roller bags;
    providing a means for regulating delivery and release of pressurized air into and from the roller bags;
    providing a means for supporting the roller bags under the pipeline while the damaged portion of the pipeline is raised from its buried position;
    providing the supporting means across the trench and under the pipeline, while extending ends of the supporting means to rest on opposing banks of the trench;
    positioning deflated roller bags in engagement with the supporting means;
    energizing the means for regulating delivery and release of pressurized air into the roller bags; and
    separately delivering pressurized air into each roller bag while inflating each roller bag to a sufficient degree to allow at least the damaged portion of the pipeline to be gradually lifted from the trench.

10. The method of claim 9, further comprising the steps of repairing the damaged portion of the pipeline and then gradually releasing the air from the inflated roller bags, while lowering the repaired portion of the pipeline to its original position in the trench.

11. The method of claim 9, wherein each of said roller bags has a substantially cylindrical configuration and a longitudinal axis, and wherein a first pre-determined quantity of the roller bags is positioned adjacent the damaged portion under the pipeline along the pipeline, and wherein a second pre-determined quantity of the roller bags is positioned immediately adjacent the damaged portion under the pipeline with their longitudinal axes being oriented transversely to a longitudinal axis of the pipeline.

12. The method of claim 11, said means for supporting the roller bags comprises providing a plurality of sling members and said step of supporting the roller bags comprises a step of positioning a plurality of sling members on the first pre-determined quantity of the roller bags.

13. The method of claim 12, each of the sling members comprises a flexible bendable upper sling portion and a flexible bendable lower sling portion.

14. The method of claim 13, wherein the upper sling portion and the lower sling portion each comprise an elongated planar main body and a plurality of flexible transverse straps secured transversely to the main body in a spaced apart relationship to each other.

15. The method of claim 14, wherein the upper sling portion and the lower sling portion further comprises a flexible end strap secured to the main body and extending from each end of the main body.

16. The method of claim 15, wherein the end straps of the upper sling portion extend across at least some of the transverse straps.

17. The method of claim 15, wherein free ends of the transverse straps and end straps carry a securing member.

18. The method of claim 17, said securing member comprising a D-ring.

19. The method of claim 17, comprising a step of providing a plurality of shackle members and connecting adjacent securing members with the shackle members.

20. The method of claim 19, wherein said step of positioning deflated roller bags in engagement with the supporting means comprises a step of positioning a plurality of the lower sling portions across trench in a spaced-apart relationship, extending ends of the lower sling portions to rest on the banks of the trench, positioning a pair of deflated roller bags across the plurality of the lower sling members, positioning a plurality of the upper sling members on the deflated roller bags across the trench in alignment with the lower sling portions, and then engaging the shackle members and the securing members of the lower sling portions with the shackle members and the securing members of the upper sling portions, thereby securing the roller bags in pairs under the pipeline.

21. The method of claim 13, further comprising a step of providing an end sling member and mounting the end sling member on each end of the roller bag, said end sling member being detachably engageable with adjacent upper sling portion and adjacent lower sling portion.

22. The method of claim 13, said end sling member having a frustoconical hollow configuration.

23. The method of claim 13, wherein longitudinal dimensions of the upper sling portion are at least slightly greater than longitudinal dimensions of the lower sling portion.

* * * * *